United States Patent

Levene et al.

[15] 3,640,093
[45] Feb. 8, 1972

[54] PROCESS OF CONVERTING METALORGANIC COMPOUNDS AND HIGH PURITY PRODUCTS OBTAINED THEREFROM

[72] Inventors: Leon Levene, Toledo, Ohio; Ian M. Thomas, Temperance, Mich.

[73] Assignee: Owens-Illinois, Inc.

[22] Filed: July 22, 1969

[21] Appl. No.: 843,777

Related U.S. Application Data

[63] Continuation-in-part of Ser. No. 805,841, Mar. 10, 1969, abandoned.

[52] U.S. Cl. ...................................65/134, 65/52, 106/39 R, 106/50, 106/308 Q
[51] Int. Cl. ....................C03b 5/16, C03c 13/00, C08h 1/34
[58] Field of Search ........................106/52, 39 R, 50, 308 Q; 65/134

[56] References Cited

UNITED STATES PATENTS

| | | | |
|---|---|---|---|
| 2,886,460 | 5/1959 | Alexander et al. | 106/308 Q |
| 3,082,051 | 3/1963 | Wainer et al. | 106/39 X |
| 3,082,099 | 3/1963 | Beasley et al. | 106/50 X |
| 3,128,196 | 4/1964 | Pierpoint et al. | 106/308 Q |
| 3,231,404 | 1/1966 | Ferrigno | 106/308 Q X |
| 3,311,481 | 3/1967 | Sterry et al. | 106/50 X |
| 3,332,490 | 7/1967 | Pitcairn et al. | 106/39 X |

*Primary Examiner*—Frank W. Miga
*Attorney*—E. J. Holler and Donald K. Wedding

[57] ABSTRACT

There is disclosed the preparation of high purity oxide products by hydrolyzing a silicon alkoxide with less than a stoichiometric amount of water so as to provide a partially hydrolyzed product. The partially hydrolyzed product is then reacted with a metal alkoxide and/or a metal salt in the presence of sufficient water to initially form a clear solution which subsequently converts to a clear gel. The gel is then heated so as to substantially remove organic and free liquid components therefrom. A homogeneous, high purity oxide product is recovered.

30 Claims, No Drawings

PROCESS OF CONVERTING METALORGANIC COMPOUNDS AND HIGH PURITY PRODUCTS OBTAINED THEREFROM

RELATED APPLICATION

This is a continuation-in-part of copending U.S. Pat. application Ser. No. 805,841, filed Mar. 10, 1969 now abandoned.

This invention relates to the preparation of high purity oxide products including high purity glasses and glass ceramics. More particularly, this invention relates to the preparation of a novel, homogeneous, high purity oxide product by the steps of:

I. hydrolyzing a silicon alkoxide with a less than stoichiometric quantity of water so as to prepare a partially hydrolyzed product;

II. reacting the partially hydrolyzed product with at least one member selected from (A) and (B), (A) and (C), or (B) so as to prepare a clear gel;
   A. a metal alkoxide so as to form a clear solution of a soluble metallosiloxane;
   B. an aqueous solution of a metal salt so as to initially form a clear solution which subsequently converts to a clear gel;
   C. a quantity of water sufficient to hydrolyze residual alkoxy groups in the metallosiloxane so as to initially form a clear solution which subsequently converts to a clear gel;

III. heating the gel so as to substantially remove organic and free liquid components therefrom;

IV. recovering a homogeneous, high purity oxide product.

In accordance with the more specific practice of this invention, the hydrolysis of the silicon alkoxide is typically accomplished by reacting about 1 equivalent of a silicon alkoxide with about 0.3 to about 1.5 equivalent of water.

Preferably the silicon alkoxide is hydrolyzed with about 0.9 to about 1 equivalent of water per equivalent of alkoxide. Generally a substantial excess of water should not be used so as to avoid interference with subsequent process reactions.

Likewise, the hydrolyzing of the silicon alkoxide is preferably accomplished in the presence of a suitable hydrolysis catalyst such as a mineral acid, e.g., HCl, or a Lewis Acid catalyst comprising compounds of a transitional element such as Zr or Ti or compounds of a non-transitional element such as Al.

The hydrolysis catalyst is used in a catalytic amount, generally about 1 to about 500 parts by weight per million parts by weight of silicon alkoxide.

The silicon alkoxide is selected from compounds of the formula $SiX_n Y_{4-n}$ wherein X is hydrogen, phenyl, or alkyls of one to six carbons; y is OR where R is an alkyl of one to six carbons; and $n$ is 0, 1, or 2.

Any suitable oxide forming metal component can be introduced into the process as a metal alkoxide and/or metal salt. Metal as used herein is defined as comprising all of the metals listed in the periodic table including the so-called metallike elements, e.g., the metalloids.

It is preferred that the desired metal components be added as the alkoxide rather than as the salt if the alkoxide is volatile and easily purified by distillation. Examples of metals which can be added in this way are as follows: Al, Ti, Ge, Zr, Hf, Th, V, Nb, Ta, B, Sn, and P. In addition, there can be used the so-called double metal alkoxides formed from two or more metals such as Mg and Al; Ca and Al.

The following metals do not form suitable volatile alkoxides and must be added as metal salts, e.g., such as nitrates, acetates, or other salts of: Li, Na, K, Rb, Cs, Cu, Mg, Ca, Sr, Ba, Fe, Co, Ni, Zn, Cd, Hg, Pb, Sc, Y, and rare earths La to Lu, inclusive.

It is contemplated using any metal alkoxide of the formula $M(OR')_x$ where X is an integer dependent upon the valence of the cation M and R' is an alkyl of one to six carbons. Specific double metal alkoxides used in the practice of this invention include $Mg Al_2(OR')_8$ and $Ca Al_2(OR')_8$ where R' is an alkyl of one to six carbons.

The contemplated metal salts are used in the form of an aqueous solution and include those soluble metal salts which decompose to oxides below about 600° C. and which react with partially hydrolyzed silicon alkoxides and/or soluble metallosiloxanes to form a clear solution capable of conversion to a clear gel. Highly preferred metal salts include the nitrates and acetates.

Suitable salt solutions are those containing soluble salts of organic acids including benzoic acid or other aromatic acids or fatty acids, alcohol acids, phenol acids, oxalic acids. Suitable soluble salts of organic acids include salts of formic, citric, propionic, tartaric, although acetic acid is highly preferred. In general, the aliphatic acids have from one to 20 carbon atoms, and the aromatic acids have from seven to 15 carbon atoms.

Nitrates can be used since the metal nitrates typically decompose to oxides below about 600° C. and leave no undesirable residue such as in the case of chlorides and sulphates. Carbonates and bicarbonates can also be used because such do not leave an objectionable residue.

The clear gel formed from the clear solution is conveniently isolated and/or recovered by any suitable means and then appropriately heated so as to remove organic and free liquid components therefrom.

In one specific embodiment hereof, the gel is heated in a pressure vessel at a temperature above the critical temperature of the liquid component(s) of the gel so as to vaporize and remove such liquid component(s) and convert the gel to a high purity oxide aerogel product having high surface area.

In another specific embodiment hereof, the gel is appropriately heated so as to dry the gel and thermally degrade the organic component(s) and thereby produce an inorganic residue of high purity oxide product.

The resulting high purity oxide product may be further heated so as to produce a highly pure glass or glass ceramic.

In one specific embodiment of this invention, a high purity silicate glass is prepared by the following steps:

1. Hydrolysis of one equivalent weight of tetraalkylorthosilicate, preferably ethylorthosilicate with about one equivalent weight of water in an alcohol solution to give an alkoxysilanol:

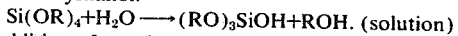

2. Addition of metal alkoxide to the alkoxysilanol to form a low molecular weight soluble metallosiloxane:

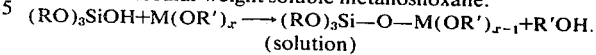

3. Addition of metal salt solution that will decompose below about 600° C. such as the solution of a metal acetate in acetic acid-water to provide a metallosiloxane solution. It is thought that no reaction takes place at this stage between metal acetate and metallosiloxane but that the addition of the metal acetate solution provides a method of dispersing metal acetate evenly throughout metallosiloxane polymer. The water present in the acetate solution causes further hydrolysis of OR and OR' groups in the metallosiloxane causing cross-linking to three-dimensional structure and eventual gellation.

The clear homogeneous gel is then dried to a granular solid by heating to about 150° C. and the solid thermally decomposed to an oxide mixture by heating slowly to about 350° C. or even up to about 700° to 800° C. or below the melting point of the glass to be formed.

Advantages of glass preparation by the method of the present invention are as follows:

1. High purity.

All components used can be purified by distillation or crystallization. Oxides in general cannot be easily purified.

2. Extreme homogeneity.

All components are initially in solution, mixture is therefore on a molecular scale. Final oxide mix does not require stirring on melting. This is especially advantageous for viscous, high melting glass melts which require long stirring periods at high temperature for cord-free glass by the conventional method.

3. Small particles size.

Dried gel which has not been thermally degraded may be ground in a ball mill to a particle size of less than 1 micron, typically less than 0.5 micron. This is because gel is friable at this stage and easily ground. The dried, ground gel may then be appropriately thermally degraded to an oxide product of the same particle size. Powdered glass is difficult to grind to 1 micron because it is hard. An alternative method for obtaining even smaller particle size is the aerogel method. Convert the gel, before drying, into an aerogel which may then be crushed into particles of size as low as 50 A. An aerogel is a fragile, extremely porous solid in which the liquid component of a normal gel has been replaced by air as described by Kistler, Journal of Physical Chemistry, Vol. 36, page 52 (1932). The aerogel method gives particle size down to at least about 100 A. (0.01 micron) and preferably in the range of about 0.001 to 0.01 micron. This is impossible to obtain by conventional methods.

Hence, it can be seen that the polymers prepared as intermediate products in the present invention are soluble and hence, at one stage, all reagents are intimately mixed, possibly on a molecular scale.

In the prior art, Holland patent application 6,706,261 discloses a process for producing a high melting glass with a low coefficient of expansion starting from metalorganic compounds. However, such Holland patent application describes the simultaneous hydrolysis of two metal alkoxides, one of which hydrolyzes at a much faster rate than the other, thereby resulting in a heterogeneous oxide mix rather than a homogeneous metalosiloxane product as prepared in the invention at bar. The Holland patent application also describes the addition of a metal salt solution to the heterogeneous oxide mix (prepared by the simultaneous hydrolysis of two metal alkoxides) and ultimately gellatin occurs; however, the Holland application goes on to describe the necessity of washing this gel mixture with boiling water which will remove some or all of the water soluble metal salts previously added. Exact glass formulation cannot therefore subsequently be prepared by this method because the quantity of salt removed by the washing is uncertain; the invention at bar does not require a washing step and thus, all added metal salt(s) is quantitively retained.

In accordance with the practice of the invention at bar, it has been further discovered that high purity homogeneous, silicate glasses can be prepared. Thus, the high purity oxide product can be further heated so as to convert such product to a fine, clear, transparent, homogeneous silicate glass of high purity, the resulting glasses containing less than 50 p.p.m. by weight of trace metal impurities. In the case of alkali-free silicate glasses, the resultant glasses have a total alkali-metal oxide content of less than about 50 p.p.m. by weight, typically less than 10 p.p.m. by weight.

Typical high purity, homogeneous silicate glass compositions prepared in accordance with this invention include the alumino silicates containing about 35 to 70 percent by weight $SiO_2$, about 5 to 35 percent by weight $Al_2O_3$, a fluxing amount up to about 35 percent by weight of at least one Group II oxide, and less than 50, preferably less than 10, p.p.m. by weight alkali oxide.

In one preferred embodiment, the glass contains about 40 to 65 percent by weight $SiO_2$, about 10 to 30 percent by weight $Al_2O_3$, a fluxing amount up to about 30 percent by weight of at least one Group II oxide, and less than 50, preferably less than 10, p.p.m. by weight alkali oxide.

The Group II oxide(s) is typically selected from oxides of Group IIA; that is, oxides of the alkaline earths—Be, Mg, Ca, Sr, and Ba.

In one specific embodiment hereof, there is prepared a glass containing oxides of both Mg and Ca, the weight ratio of CaO to MgO being about 1:1 to about 2:1, typically about 1.3:1 to about 1.6:1.

In other specific embodiments hereof, the glass contains oxides of Group IIB (zinc and cadmium) in addition to or in lieu of the Group IIA oxides.

In still other specific embodiments hereof, the glass contains 0 to 30%, typically 10 to 25%, by weight $Cu_2O$ in addition to or in lieu of the Group II oxide(s). Likewise, small effective amounts (0 to 5% by weight) of fluorine may be present.

In one highly specific embodiment of this invention, there is prepared a glass composition containing about 60 to 62 percent by weight $SiO_2$, about 25 to 27 percent by weight $Al_2O_3$, about 4 to 6 percent by weight MgO, about 6 to 8 percent by weight CaO, and less than 50 p.p.m., typically less than 10 p.p.m., by weight alkali metal oxide.

The following examples are intended to illustrate the present invention relative to the prior art and also present some of the best embodiments contemplated by the inventors in the practice of this invention.

EXAMPLE 1

$TiO_2$-$SiO_2$ oxide compositions were prepared and glasses prepared therefrom in which parts A and B followed the prior art method and parts C and D follow the methods of the present invention.

PART A—The following ingredients were used to prepare an oxide composition:

| Ingredients | Grams |
| --- | --- |
| Tetramethylsilicate | 228 |
| Tetra-n-butyltitanate | 40 |

The above-identified reagents were stirred in a flask until homogeneous and then warmed to 45° C. Water was then added dropwise. Almost immediately, a white precipitate formed and the mixture became very warm. The mixture gelled and foamed up when 45 ml. of water had been added. The gel was crushed fairly fine and then boiled with 1,500 ml. water for 2½ hours. Subsequently, the boiled mixture was cooled and the solids filtered off and dried by heating to 600° C. slowly over a period of 32 hours. A fine, white, granular $TiO_2$-$SiO_2$ product (96 grams) was obtained.

PART B—In a similar manner, tetraethylsilicate (224 grams) and tetraisopropyltitanate (25 grams) were reacted and processed as described in Part A and a fine, white, granular powder (70.5 grams) was obtained.

PART C—The following ingredients were reacted and processed according to the methods of the present invention:

| Ingredients | Grams |
| --- | --- |
| Tetramethylsilicate | 113 |
| Tetra-n-butyltitanate | 20 |

The tetramethylsilicate was hydrolyzed in 60 ml. of methanol with 15 ml. water and 1 drop $1N$ HCl solution. The temperature rose to about 45° C. and a clear solution was obtained. Tetra-n-butyltitanate was added to the clear solution followed by an additional 30 ml. water. The resulting clear, colorless solution became very warm and gelled to a clear, colorless gel within 10 minutes. The resultant gel was broken up and then heated slowly to 600° C. over a period of 24 hours. A substantially white, granular solid $TiO_2$-$SiO_2$ product (47.5 grams) was obtained.

PART D—In a manner like that of Example 1-C, 224 grams of tetraethylsilicate and 25 grams of tetraisopropyltitanate were used to prepare a pure, white granular product (70.3 grams).

Samples of the products of Parts 1-A, 1-B, 1-C and 1-D were heated in platinum crucibles in the same furnace for 14 hours at 1,800° F. and also for 6 hours at 2,900° F. The resultant heated samples 1-A and 1-B were opaque and were observed to have a large number of solid particles dispersed in a glassy, clear phase; numerous seeds (very fine gas bubbles) also being present.

In sharp contrast, the resultant heated samples 1-C and 1-D were almost completely transparent and glassy, there being numerous seeds present.

The presence of opaque solid particles in the 1-A and 1-B samples clearly indicate that these products are not as homogeneous as the samples of 1-C and 1-D which were substantially transparent.

It can be seen that the method used to prepare Examples 1-C and 1-D involves initial hydrolysis of silicate to a relatively low molecular weight polymer containing silanol groups. The addition of the titanium alkoxide (the tetra-n-butyl-titanate or tetraisopropyltitanate) then provides a titanosiloxane polymer by reaction with the silanol groups along the lines of the following equations:

$$Si(OR)_4 + H_2O \longrightarrow (RO)_3SiOH + ROH$$
$$(RO)_3SiOH + Ti(OR')_4 \longrightarrow (RO)_3Si\text{-}O\text{-}Ti(OR')_3 + R'OH$$

It can be seen that the addition of more water causes the hydrolysis of residual OR and OR' groups on the titanosiloxane polymer leading to cross-linking and condensation to three-dimensional gel structures.

It can also be seen that the methods used to prepare Examples 1-A and 1-B involve the hydrolysis of the individual silicon alkoxide and titanium alkoxide at the same time. As titanium alkoxides hydrolyze very much faster than the silicon alkoxides, it is apparent that generally the initial precipitate formed in the reaction is substantially pure hydrated titanium oxide. Thereafter, the silicon alkoxide hydrolyzes and a relatively nonhomogeneous mixture is formed as shown by the results obtained in Examples 1-A and 1-B.

The samples described in Examples 1-A, 1-B, 1-C and 1-D were further heated for 17 hours at 2,800° F. Samples 1-A and 1-B were clear, glassy with some individual solid particles still visible. The samples were quite seedy. The samples 1-C and 1-D were clear and glassy with no sign of any individual particles. The samples were quite seedy but individual particles were not present as far as visible eye could determine.

The examples were still further heated for 6 hours at 2,900° F. with little change in the appearance of the samples except that all the samples were less seedy than before.

A standard batch (90 percent by weight $SiO_2$, 10 percent $TiO_2$) prepared from Ottawa ground flint and titanium dioxide in comparison showed only some sintering and no melting after 6 hours at 2,900° F. After 89 hours of attempted melting, the standard batch is only partially melted.

EXAMPLE 2-A

The following ingredients were used to prepare oxide compositions from which subsequently glasses were prepared:

| Ingredients | Grams | Amount of oxide in each ingredient | | Percent by weight of the oxide |
|---|---|---|---|---|
| Methylsilicate | 74.3 | $SiO_2$ | 29.3 grams | 66.8 |
| Aluminum isopropoxide | 13.4 | $Al_2O_3$ | 3.35 grams | 7.6 |
| Calcium chloride | 7.7 | CaO | 3.79 grams | 8.7 |
| Magnesium chloride·6$H_2O$ | 5.4 | MgO | 1.06 grams | 2.4 |
| Sodium chloride | 11.9 | $Na_2O$ | 6.30 grams | 14.5 |

A solution of $CaCl_2$ in 50 ml. water was added to a mixture of aluminum isopropoxide and tetramethyl orthosilicate. $MgCl_2·6H_2O$ in 50 ml. water then was added to the mixture, followed by NaCl in 100 ml. water. The mixture became very hot and a gel was precipitated. After stirring for 1 hour, the gel swelled and a very thick mixture was obtained. Additional water (250 ml.) was used and the mixture heated to about 60° C.; the gel continued to swell and could not be stirred after 90 minutes. The total product then was poured into 600 ml. water and heated to the boiling point for 1 hour. The resulting solid was filtered off and dried by heating slowly to 1,200° F. over 48 hours. A white, granular, solid product was obtained (34.2 grams).

The addition of NaOH solution to the filtrate after the water boil produced a white precipitate that could have been calcium hydroxide or magnesium hydroxide. This, along with the low yield, suggests the theory that calcium, magnesium and sodium were removed from the product by the water treatment.

Upon heating the product in a platinum crucible it fused to a porous frit after 16 hours at 1,350° C. The glass, which appeared to have lost calcium, magnesium and sodium, had the following approximate analysis:

| Ingredients | Percent by weight | |
|---|---|---|
| | Analyzed | Starting Sample |
| $SiO_2$ | 83.3 | 66.8 |
| $Al_2O_3$ | 9.65 | 7.6 |
| CaO | 2.49 | 8.7 |
| MgO | 0.62 | 2.4 |
| $Na_2O$ | 3.74 | 14.5 |

It can be seen that the process employed in Example 2-A cannot be used to prepare exact glass formulations which contain water soluble chlorides because they will be lost at least in part by the water wash.

EXAMPLE 2-B

The following ingredients were used to prepare high purity homogeneous products according to the present invention:

| Ingredients | Grams | Oxide in Each Ingredient | Weight of the Oxide (Grams) |
|---|---|---|---|
| Ethylsilicate | 232.0 | $SiO_2$ | 66.8 |
| Aluminum isopropoxide | 30.6 | $Al_2O_3$ | 7.6 |
| Calcium acetate·$H_2O$ | 27.2 | CaO | 8.7 |
| Magnesium acetate·4$H_2O$ | 12.7 | MgO | 2.4 |
| Sodium acetate | 38.1 | $Na_2O$ | 14.5 |

Ethylsilicate, one of the above-listed ingredients, was hydrolyzed in 130 ml. ethanol and 20 ml. water with 5 drops 1N HCl solution by heating to 50° C. After cooling for 20 minutes, $Al(OPr)_3$ (Pr representing propyl) was added to give a clear solution. All the acetates were dissolved in 200 ml. water and 100 ml. acetic acid and the solution added to the ethylsilicate-$Al(OPr)_3$ solution. The resulting solution was clear and this clear solution gelled to a clear, colorless rubbery gel in approximately 40 minutes. The gel was dried and calcined by heating to 400° C. over a period of 50 hours. A brown, granular product (105 grams) was obtained. This granular product was heated in a platinum crucible to provide a clear, colorless glass which glass was obtained after 16 hours at 1,200° C. The approximate analysis of the glass was as follows:

| Ingredients | Percent by weight |
|---|---|
| $SiO_2$ | 67.5 |
| $Al_2O_3$ | 8.0 |
| CaO | 9.4 |
| MgO | 2.2 |
| $Na_2O$ | 12.9 |

The above-described reaction was repeated using equivalent quantities of calcium, magnesium and sodium chloride instead of the acetates of calcium, magnesium and sodium. A nearly white product was obtained after heating to 400° C. However, the yield was high, being about 118 grams. Apparently large amounts of chlorides were still present.

Upon heating the above-described product to 1200° C. overnight, an opaque glass was obtained having the following analysis:

| Ingredients | Percent by weight | |
|---|---|---|
|  | Actual | Starting |
| SiO₂ | 73.0 | 66.8 |
| Al₂O₃ | 8.6 | 7.6 |
| CaO | 9.9 | 8.7 |
| MgO | 2.5 | 2.4 |
| Na₂O | 5.7 | 14.5 |

The above analysis indicates that NaCl and some MgCl₂ were lost through volatilization during the melting process. It points out also that even with proper handling, the use of metal chlorides is not too desirable and the superiority of the use of salts of organic acids is readily apparent.

It can be seen that the method of the present invention does not involve washing of the gel and loss of the components can occur only if they occur through volatilization during melting of the glass. Thus, it is apparent that the washing of the gel is not required and the exact glass composition can be prepared with certainty from the selected starting materials. It can be seen that the foregoing method of the prior art, which involves the formation of a gel from two different alkoxides at the same time and the washing of such gel, does not result in a homogeneous product.

EXAMPLE 3

The following ingredients were used to prepare oxide compositions from which subsequently glasses were prepared:

| Ingredients | Grams | Oxide in each Ingredient | Grams |
|---|---|---|---|
| Ethylsilicate | 213 | SiO₂ | 61.5 |
| Aluminum isopropoxide | 104.5 | Al₂O₃ | 26.1 |
| Magnesium acetate·4H₂O | 27.7 | MgO | 5.2 |
| Calcium acetate·H₂O | 22.7 | CaO | 7.2 |

Ethylsilicate was dissolved in 120 ml. ethanol and 18 ml. water added when a clear solution had been obtained. Five drops of 1N HCl solution was added and the solution heated to about 50° C. After cooling at room temperature for 20 minutes, aluminum isopropoxide was added; this dissolved with the liberation of heat within 15 minutes. A solution of the calcium and magnesium acetates in water (200 ml.) and acetic acid (100 ml.) was then added and the resulting clear solution gelled within 30 minutes.

The gel was dried in a vacuum oven at 80° C. overnight and then heated slowly to 400° C. over a period of 20 hours and finally at 400° C. for 24 hours. An off-white granular solid was obtained (108.5 grams); this contained some carbonate and the theoretical weight of 100 grams was obtained on further heating to 900° C.

A sample was melted to a clear glass at 1,450° C. overnight. D.T.A. analysis of this sample gave a curve substantially identical to that of a sample prepared by melting a physical mixture of the component oxides.

Chemical analysis of the melted glass was as follows:

| SiO₂ | 61.65% | (requires 61.5%) |
|---|---|---|
| Al₂O₃ | 25.97% | (requires 26.1%) |
| MgO | 5.1% | (requires 5.2%) |
| CaO | 7.1% | (requires 7.2%) |
| Na₂O | 16 p.p.m. | |
| K₂O | 7 p.p.m. | |
| Li₂O | 5 p.p.m. | |

This illustrates the accuracy of the method in making up specific compositions and the extreme purity of the resultant glass.

EXAMPLE 4

The following ingredients were used to prepare oxide compositions from which glasses were subsequently prepared:

| Ingredients | Grams | Oxide in each Ingredient | Grams |
|---|---|---|---|
| Ethylsilicate | 206 | SiO₂ | 59.5 |
| Aluminum sec-butoxide | 81.4 | Al₂O₃ | 16.85 |
| Cupric nitrate·3H₂O | 80 | Cu₂O | 23.65 |
|  |  | Total | 100.0 |

Ethylsilicate was hydrolyzed in ethanol (116 ml.) and water (18 grams) and 5 drops of 1N HCl solution by heating to about 50° C. The solution was allowed to cool at 30° C. and the aluminum sec-butoxide added. A clear solution resulted. Copper nitrate dissolved in water (100 ml.) was then added to the resulting clear (aluminosiloxane) solution. A clear deep blue solution resulted which gelled in a few minutes to a clear blue gel.

The gel was broken up and dried for 17 hours at 200° C., for 1 hour at 250° C., 4½ hours at 300° C., and then heated slowly to 400° C. and held at this temperature for 18 hours. The resulting product was a black granular solid (107.4 grams).

A 10.7 grams sample of the black granular product was heated slowly to a melting temperature of 1,300° C. and held at such temperature for 4 hours. There was recovered 10.0 grams of black glass having the following analysis:

| Oxide | Percent by weight |
|---|---|
| SiO₂ | 58.9 |
| Al₂O₃ | 16.7 |
| Cu₂O | 24.0 |

EXAMPLE 5

The following ingredients were used to prepare oxide compositions from which subsequently glasses were prepared. This glass is used for applications where it is required that the iron content be as low as possible.

| Ingredients | Grams | Oxide in each Ingredient | Grams |
|---|---|---|---|
| Ethylsilicate | 230 | SiO₂ | 66.3 |
| Aluminum sec-butoxide | 22.7 | Al₂O₃ | 4.7 |
| Lithium carbonate | 37.3 | Li₂O | 15.1 |
| Calcium acetate | 32.5 | CaO | 10.3 |
| Neodymium oxide | 3.1 | Nd₂O₃ | 3.1 |
| Ceric ammonium nitrate | 1.6 | CeO₂ | 0.5 |

Ethylsilicate was dissolved in ethanol (200 ml.) and water 20 grams) followed by 5 drops of 1N HCl solution then added. The clear solution was heated to about 50° C., cooled to 30° C. and the aluminum alkoxide added.

Lithium carbonate was added in portions to a mixture of acetic acid (150 ml.) and water (250 ml.) and when this had dissolved, the calcium acetate and neodymium oxide were added. The resulting clear lavender colored solution was added to the aluminosiloxane solution and finally the ceric ammonium nitrate in water (10 ml.). On stirring a gray solution resulted and this gelled within 30 minutes.

The gel was dried at 200° C. for 8 hours and then heated slowly to 400° C. and held at this temperature for 16 hours. A light gray powdered product (102 grams) was obtained.

This could be melted to a clear pink glass at 1,100° C. in 6 hours. D.T.A. on this glass gave the same result as that on one prepared from the component oxides. The analysis indicated the iron content of the final glass was only 4 p.p.m.

EXAMPLE 6

The following ingredients were used to prepare high purity homogeneous products according to the present invention:

| Ingredients | Grams | Oxide in each Ingredient | Grams |
| --- | --- | --- | --- |
| Ethyl silicate | 600 | $SiO_2$ | 173 |
| Aluminum isopropoxide | 260 | $Al_2O_3$ | 65 |
| Sodium acetate | 71.5 | $Na_2O$ | 27 |
| | | Total | 265 |

Ethyl silicate was hydrolyzed in ethanol (300 ml.) with water (50 ml.) and 10 drops of 1N HCl solution as catalyst by heating to about 50° C. Aluminum isopropoxide was then added with stirring and a clear solution was obtained within a few minutes. Sodium acetate was dissolved in water (200 ml.) with acetic acid (100 ml.) and this solution then added to the aluminosiloxane solution. A crystal clear solution resulted which gelled to a clear gel in 1 hour.

The gel was broken up and then dried in a vacuum oven at 90° C. overnight. It was then heated in air at 200° C. for 20 hours, at 300° C. for 4 hours, at 350° C. over a weekend and finally at 400° C. for 4 hours. A very light brown granular solid was obtained (274 g.:103 percent yield).

Three separate 10 mg. granules were selected at random and analyzed for silica and alumina with the following percent by weight results:

| $SiO_2$ | 63.9% | 64.0% | 64.5% |
| --- | --- | --- | --- |
| $Al_2O_3$ | 24.1% | 24.3% | 24.0% |

The theoretical values (allowing for the 3 percent yield overweight) are $SiO_2$, 63.5%; $Al_2O_3$, 23.8%. The foregoing results illustrate outstanding homogeneity especially in view of the fact that the granular solid had not been melted.

EXAMPLE 7

The following ingredients were used to prepare high purity homogeneous products according to the present invention:

| Ingredients | Grams | Oxide in each Ingredient | grams | Percent by weight |
| --- | --- | --- | --- | --- |
| Ethyl Silicate | 815 | $SiO_2$ | 234.5 | 58.7 |
| Aluminum sec-butoxide | 230 | $Al_2O_3$ | 47.6 | 11.9 |
| Barium acetate | 104 | BaO | 62.4 | 15.6 |
| Calcium oxide | 45.6 | CaO | 45.6 | 11.4 |
| Magnesium acetate·$4H_2O$ | 51.1 | MgO | 9.6 | 2.4 |
| | | Total | 400.0 | 100.0 |

Ethyl silicate was hydrolyzed in ethanol (530 ml.) with water (71 ml.) and 15 drops of 1N HCl solution as catalyst by heating to about 50° C. Aluminum sec-butoxide was then added with stirring after cooling of the solution to 30° C. A clear solution soon resulted. The following solutions were then added in succession: magnesium acetate in water (165 ml.) and acetic acid (50 ml.), barium acetate in water (300 ml.) and acetic acid (80 ml.) and finally calcium oxide in acetic acid (110 g.) and water (750 ml.). A clear solution was ultimately obtained which gelled within 20 minutes.

The gel was broken up and heated as follows: 200° C. for 22 hours, 250° C. for 4 hours, 300° C. for 4 hours and finally, 350° C. for 16 hours. A light brown granular solid was obtained (442g.:110.5 percent yield).

A 11.0 grams sample of the light brown granular solid was heated at 800° C. for 6 hours and then melted at 1,450° C. for 16 hours to obtain 10.0 grams of a clear colorless glass. An analysis of this glass gave the following percent by weight results:

| $SiO_2$ | 58.7 |
| --- | --- |
| $Al_2O_3$ | 12.0 |
| BaO | 15.8 |
| CaO | 11.3 |
| Mgo | 2.2 |
| $Na_2O$ | 38 p.p.m. |
| $K_2O$ | 29 p.p.m. |
| $Li_2O$ | 8 p.p.m. |

In the above examples, other alkoxides previously described as useful can be used in whole or part for the alkoxides used in the examples to provide substantially equivalent results. Other metal acetates can be used or other solutions of metal salts that decompose below about 600° C. previously described as being useful can be used in place of the salts of acetates used in the examples to provide substantially equivalent results.

We claim:

1. A process for preparing a homogeneous oxide product which comprises:
   I. combining a silicon alkoxide of the formula $SiX_nY_{4-n}$, wherein X is hydrogen, phenyl or alkyls of one to six carbon atoms, Y is OR wherein R is an alkyl of one to six carbon atoms and $n$ is 0 or 1 with less than a stoichiometric quantity of water in the presence of an effective catalytic amount of an acid hydrolysis catalyst so as to form a clear solution of a soluble, partially hydrolyzed silicon alkoxide,
   II. reacting said clear solution of a soluble, partially hydrolyzed silicon alkoxide with a metal alkoxide so as to form a clear solution of a soluble, further hydrolyzable metallosiloxane,
   III. reacting said clear solution of a soluble, further hydrolyzable metallosiloxane with an additional quantity of water, said additional quantity of water being sufficient to hydrolyze said further hydrolyzable metallosiloxane so as to initially form a solution which subsequently converts to a gel structure containing a cross-linked metallosiloxane,
   IV. heating said gel structure at a temperature and for a time sufficient to convert said gel structure to a granular oxide product and recovering said granular product.

2. The process of claim 1 wherein said additional water which is reacted in Step III is a water solution of a metal salt which decomposes to an oxide below about 600° C.

3. The product produced in accordance with the process of claim 1.

4. The process of claim 1 and further including the step of:
   V. heating said granular oxide product to a temperature and for a time sufficient to prepare a glass.

5. The process of claim 1 wherein said metal alkoxide is a compound of the formula $M(OR')_x$ wherein M represents a cation, R' represents an alkyl of one to six carbon atoms and X is an integer dependent on the valence of M.

6. The process of claim 1 wherein said metal alkoxide is a double metal alkoxide.

7. The process of claim 2 wherein said metal salt is a salt of an organic acid.

8. The process of claim 5 wherein said acid hydrolysis catalyst is a mineral acid.

9. The process of claim 1 wherein the amount of water which is combined with said silicon alkoxide is about 0.3 to about 1.5 equivalents per equivalent of silicon alkoxide and wherein $n$ is 0.

10. The process of claim 9 wherein said silicon alkoxide is ethylsilicate.

11. The process of claim 9 wherein said silicon alkoxide is methylsilicate.

12. The process of claim 1 wherein $n$ in said formula is 1.

13. A process for preparing a homogeneous oxide product which comprises:
 1. combining a silicon alkoxide of the formula $SiX_nY_{(4-n)}$, wherein X is hydrogen, phenyl or alkyls of one to six carbon atoms, Y is OR, wherein R is an alkyl of one to six carbon atoms and $n$ is 0 or 1 with less than a stoichiometric quantity of water in the presence of an effective catalytic amount of an acid hydrolysis catalyst so as to form a clear solution of a soluble, partially hydrolyzed silicon alkoxide having residual OR groups,
 2. reacting said clear solution of a soluble, partially hydrolyzed silicon alkoxide with a water solution of a metal salt of an organic acid, which salt decomposes to an oxide below about 600° C., sufficient water being added to hydrolyze said residual OR groups so as to initially form a clear solution which subsequently converts to a gel structure,
 3. heating said gel structure at a temperature and for a time sufficient to convert said gel structure to a granular oxide product and recovering said granular product.

14. The process of claim 13 wherein $n$ is 0.

15. The process of claim 13 wherein $n$ is 1.

16. The process of claim 13 wherein said organic acid is an aliphatic acid having from one to 20 carbon atoms.

17. The process of claim 13 wherein said organic acid is an aromatic acid having from seven to 15 carbon atoms.

18. The process of claim 13 wherein said method further includes the step of heating said granular oxide product to a temperature and for a time sufficient to prepare a glass.

19. The process of claim 13 wherein said water solution of a metal salt of an organic acid is a water solution of a metal acetate.

20. The process of claim 14 wherein the amount of water which is combined with said silicon alkoxide is about 0.3 to about 1.5 equivalents per equivalent of silicon alkoxide.

21. A process for producing a homogeneous silicate glass which comprises:
 1. reacting an alkoxide of the formula $Si(OR)_4$ wherein R is an alkyl of one to six carbon atoms with about 0.3 to about 1.5 equivalents of water per equivalent of said alkoxide in the presence of an effective catalytic amount of an acid hydrolysis catalyst so as to prepare a clear solution of a partially hydrolyzed silicon alkoxide,
 2. combining said solution of a partially hydrolyzed silicon alkoxide with a metal alkoxide of the formula $M(OR')_x$ wherein M represents a cation, R' is an alkyl of one to six carbon atoms and X is an integer dependent upon the valence of the cation, and allowing said combined ingredients to react so as to form a clear solution of a soluble, further hydrolyzable metallosiloxane,
 3. combining said clear solution of a soluble, further hydrolyzable metallosiloxane with an additional quantity of water, said quantity of water being sufficient to hydrolyze said further hydrolyzable metallosiloxane so as to initially form a clear solution which subsequently converts to a gel structure,
 4. heating said gel structure at a temperature and for a time sufficient to convert said gel structure to a granular oxide product,
 5. heating said granular oxide product to a temperature and for a time sufficient to prepare a homogeneous, high purity silicate glass.

22. The process of claim 21 wherein said step of reacting said alkoxide and water is done in an alcohol solution.

23. The process of claim 22 wherein said alcohol is methanol.

24. The process of claim 22 wherein said alcohol is ethanol.

25. The process of claim 21 wherein said catalyst is HCl.

26. The process of claim 25 wherein said alkoxide is ethylsilicate.

27. The process of claim 26 wherein M is titanium.

28. The process of claim 26 wherein M is aluminum.

29. A process for preparing a homogeneous high purity silicate glass which comprises:
 1. reacting an alkoxide of the formula $Si(OR)_4$ wherein R is an alkyl of one to six carbon atoms with about 0.3 to about 1.5 equivalents of water per equivalent of said alkoxide in the presence of an effective catalytic amount of an acid hydrolysis catalyst so as to prepare a solution of a partially hydrolyzed silicon alkoxide,
 2. combining said solution of a partially hydrolyzed silicon alkoxide product with a metal alkoxide of the formula $M(OR')_x$ wherein M represents a cation, R' is an alkyl of one to six carbon atoms and X is an integer dependent upon the valence of the cation, and allowing said combined ingredients to react so as to form a clear solution of a soluble metallosiloxane having residual OR and OR' groups,
 3. reacting said solution of a soluble metallosiloxane with a water solution of a metal salt that decomposes to an oxide below about 600°, sufficient water being employed to react with said residual OR groups and OR' groups so as to obtain a clear solution which subsequently converts to a gel structure,
 4. heating said gel structure at a temperature and for a time sufficient to convert said gel structure to a granular oxide product,
 5. heating said granular oxide product to a temperature and for a time sufficient to produce a homogeneous, high purity glass.

30. The process of claim 29 wherein M is Al.

* * * * *